(12) United States Patent
Sauer

(10) Patent No.: US 12,556,880 B2
(45) Date of Patent: Feb. 17, 2026

(54) METHOD FOR TRANSFERRING SUBSCRIPTION DATA AND NETWORK DEVICE

(71) Applicant: SIEMENS AKTIENGESELLSCHAFT, Munich (DE)

(72) Inventor: Markus Sauer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 388 days.

(21) Appl. No.: 18/023,722

(22) PCT Filed: Aug. 26, 2021

(86) PCT No.: PCT/EP2021/073565
§ 371 (c)(1),
(2) Date: Feb. 27, 2023

(87) PCT Pub. No.: WO2022/043412
PCT Pub. Date: Mar. 3, 2022

(65) Prior Publication Data
US 2024/0244393 A1     Jul. 18, 2024

(30) Foreign Application Priority Data
Aug. 28, 2020  (DE) ............... 10 2020 210 903.6

(51) Int. Cl.
*H04W 4/021*     (2018.01)
*H04L 67/12*     (2022.01)

(52) U.S. Cl.
CPC ............ *H04W 4/021* (2013.01); *H04L 67/12* (2013.01)

(58) Field of Classification Search
CPC ... H04L 67/12; H04L 67/125; H04L 63/1416; H04L 43/10; H04W 4/38; H04W 4/70; H04W 4/021; H04W 84/18
See application file for complete search history.

(56) References Cited

U.S. PATENT DOCUMENTS

2011/0035187 A1* 2/2011 Dejori ................ G06F 9/44526
                                                            702/187
2015/0199903 A1* 7/2015 Cuomo ................ H04W 4/021
                                                            340/905

(Continued)

FOREIGN PATENT DOCUMENTS

CN       106461408 A    2/2017
DE       102019117914 A1   1/2021

OTHER PUBLICATIONS

Li et al., "Location-Aware Publish/Subscribe" (Year: 2013).*

(Continued)

*Primary Examiner* — Dung Hong
(74) *Attorney, Agent, or Firm* — Lempia Summerfield Katz LLC

(57) ABSTRACT

In the method for transferring subscription data of a publish-subscribe system by means of a network device of a network, the subscription data are characterised by at least one identifier, the at least one identifier comprising at least one item of location information in the form of geographic location coordinates and/or spatial grid coordinates. The network device is designed to receive and/or provide subscription data of a publish-subscribe system and is designed, on the basis of at least one item of location information, to filter an identifier that characterises the subscription data.

14 Claims, 1 Drawing Sheet

(56) References Cited

U.S. PATENT DOCUMENTS

| | | | | |
|---|---|---|---|---|
| 2016/0050269 | A1* | 2/2016 | Botticelli | H04L 67/1076 |
| | | | | 709/218 |
| 2016/0198430 | A1* | 7/2016 | Jiménez | H04W 64/00 |
| | | | | 455/456.5 |
| 2017/0148321 | A1 | 5/2017 | Lamprecht et al. | |
| 2018/0189303 | A1* | 7/2018 | Mankovskii | G06Q 10/06 |
| 2019/0133445 | A1* | 5/2019 | Eteminan | A61B 5/1112 |
| 2019/0190999 | A1* | 6/2019 | Cheung | G06K 7/10366 |
| 2019/0289089 | A1* | 9/2019 | Huang | H04L 67/55 |
| 2021/0006938 | A1* | 1/2021 | Schulte | G01C 21/3446 |

OTHER PUBLICATIONS

Herlé, Stefan, Ralf Bill, and Jorg Manfred Blankenbach. "A GeoEvent-driven architecture based on GeoMQTT for the Geospatial IoT" Diss. Geodatisches Institut, Rheinisch-Westfälische Technische Hochschule, 2019. pp. 1-287.

OASIS Standard, MQTT Version 5.0 dated Mar. 7, 2019, a href="https://docs.oasisopen.org/mqtt/mqtt/v5.0/os/mqtt-v5.0-os.html#_Toc3901241 "target="_blank" https://docs.oasisopen.org/mqtt/mqtt/v5.0/os/mqtt-v5.0-os.html#_Toc3901241/a. pp. 1-114.

PCT International Search Report and Written Opinion of International Searching Authority mailed Dec. 13, 2021 corresponding to PCT International Application No. PCT/EP2021/073565.

Plus Codes, Retrieved Oct. 30, 2020. a href="https://maps.google.com/pluscodes/ "target="_blank" https://maps.google.com/pluscodes//a. pp. 1-5.

Wikipedia "Open Location Code" Retrieved Oct. 30, 2020. pp. 1-4. a href="https://en.wikipedia.org/wiki/Open_Location_Code "target="_blank" https://en.wikipedia.org/wiki/Open_Location_Code/a.

* cited by examiner

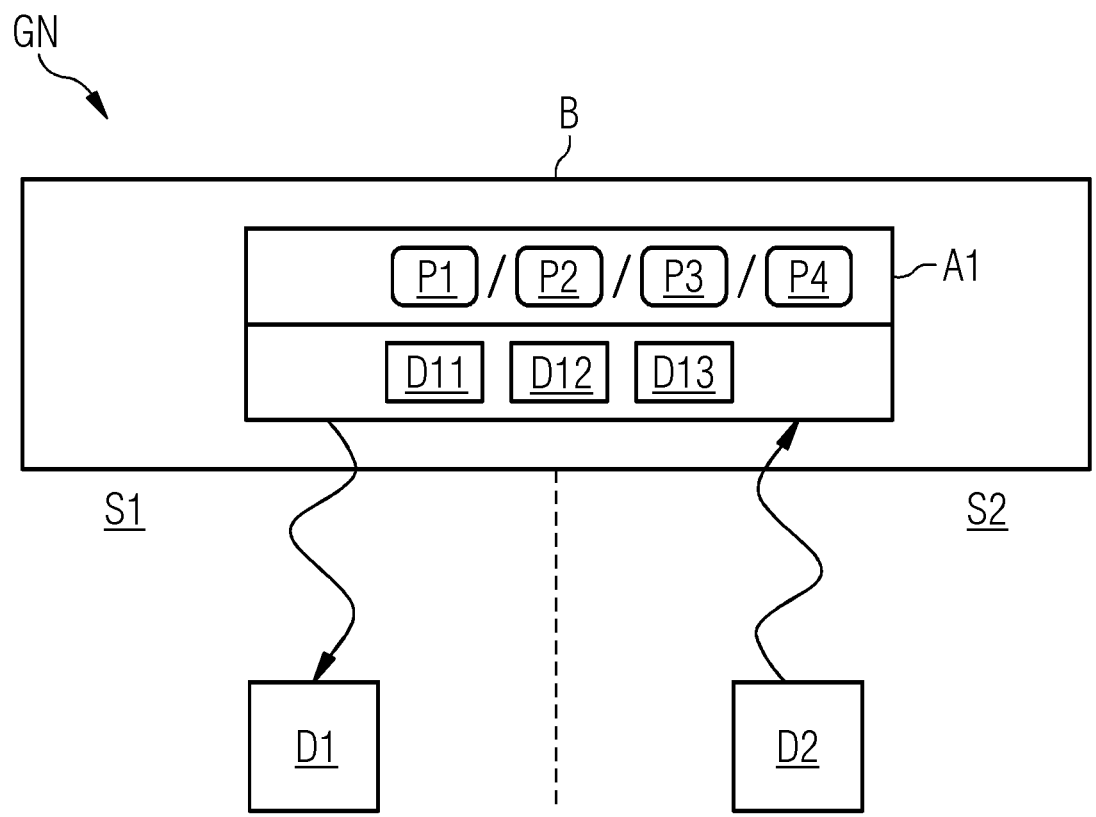

METHOD FOR TRANSFERRING SUBSCRIPTION DATA AND NETWORK DEVICE

This application is the National Stage of International Application No. PCT/EP2021/073565, filed Aug. 26, 2021, which claims the benefit of German Patent Application No. DE 10 2020 210 903.6, filed Aug. 28, 2020. The entire contents of these documents are hereby incorporated herein by reference.

BACKGROUND

The present embodiments relate to transferring subscription data and a network device.

Applications both in the industrial environment and in the consumer environment are increasingly based on ever larger and more complex networks of distributed network devices. Such network devices are, for example, sensors, IoT devices, IoT gateways, edge devices, cloud services, smartphones, or augmented/virtual reality devices. An advantage of an application of such distributed network devices is a continuous possible communication between these network devices, which allows a strong interaction of the network devices with each other.

In well-known industrial systems, the communication of network devices with each other have been planned statically and developed accordingly. Ever stronger demands for application and configuration flexibility, but also the increasing mobility of high-performance and feature-rich network devices, require new communication paradigms. Such requirements exist, for example, in autonomous cars, autonomous transport vehicles, drones, smartphones, or high-altitude platforms, and in the use of low-cost components, for example, "disposable" sensors. An approach to current technology and architecture developments consists of a common coupling of the network devices for interaction (e.g., a coupling by group-to-group connections). This is in contrast to a previously common rigid configuration of all interaction channels (e.g., using REST-APIs or other request-response techniques), with which each network device is connected to a corresponding counterpart component by a plurality of one-to-one connections.

In order to enable group-to-group connections, publish-subscribe systems, for example, are used today, especially realized using MQTT, DDS, WAMP or ZeroMQ. In such publish-subscribe systems, the communication process no longer takes place using a device address (e.g., equipment-centered), but data-centered using subscriptions to previously published topics (e.g., technical topics). For example, three sensors A, B, C may continuously publish their sensor values in the form of temperature values on a topic called "temperature". For example, Sensor A publishes on "temperature/A", sensor B publishes on "temperature/B", and sensor C publishes on "temperature/C". Two data consumption components E, F subscribe to the topic "temperature". In this system, the data consumption components E, F would receive all sensor values displayed on the topic without having to know of the sensors A, B, C. If a sensor fails (e.g., Sensor A), the network continues to operate without any configuration adjustments having to be made. If another sensor D is added, the same applies with no adjustments of the configuration necessary.

Nevertheless, dynamic networks have not yet been easy to flexibly configure and set up with regard to spatial requirements.

SUMMARY AND DESCRIPTION

The scope of the present disclosure is defined solely by the appended claims and is not affected to any degree by the statements within this description.

The present embodiments may obviate one or more of the drawbacks or limitations in the related art. For example, an improved method for transferring subscription data is provided. As another example, a method by which a publish-subscribe system may be flexibly adapted to spatial requirements is provided. As yet another example, improved network devices by which the improved method may be carried out are provided.

With the method according to the present embodiments for transferring subscription data of a publish-subscribe system by a network device, the subscription data is identified by at least one identifier representing at least one item of location information in the form of geographical location coordinates and/or two-dimensional or spatial grid coordinates and/or hierarchical and/or semantic coordinates.

In one embodiment, the subscription data includes the identifier, or the identifier references the subscription data.

With previously known methods, network devices subscribe to subscription data independently of their spatial context, and add location information to the corresponding subscription data, such as temperature values, and only then, filter at the application level after receiving the subscription data. As a result, a large amount of network traffic is caused, which may be avoided according to the present embodiments. This is because the subscription data of publish-subscribe systems may be limited with the method according to the present embodiments to one or more spatial contexts using the location information.

In the case of a spatial movement (e.g., a change of location) of network devices, the networks have until now also been changed. This has, so far, separated publish-subscribe systems spatially and physically from each other and reduced the connection of the network devices to the respective network devices within reach. However, this approach is very static and limits the flexibility of connections from network devices to spatially overlapping networks. Further, such known solutions also require proxy mechanisms in the infrastructure in order to set up spatial cross-region subscriptions. Using the method according to the present embodiments, a change of location of network devices is possible considerably more flexibly. Using the method according to the present embodiments, subscription data of mobile network devices may thus be dynamically managed location-specifically (e.g., taking into account the current location information).

Further, access safeguards and data protection measures adapted to the location information and based on identifiers may be used, so that special local security requirements may be easily met by the method according to the present embodiments.

The method according to the present embodiments may be carried out by known publish-subscribe systems, so that in this respect, no more complex adjustments are necessary. Consequently, existing networks may be easily upgraded for the execution of the method according to the present embodiments. The administration at the application level may be carried out dynamically using the method according to the present embodiments. An intervention or an adjustment in lower level network layers is not required.

With the method according to the present embodiments, the at least one item of location information is used for an operation and/or a function of the network device.

With the method according to the present embodiments, the function may be a function in a working and/or manufacturing process (e.g., at least one process step of the working and/or manufacturing process) and/or an information item (e.g., a sensor information item for carrying out at least one process step of the working and/or manufacturing process), and/or a control function of at least one process step of the working and/or manufacturing process.

In this way, working and/or manufacturing processes may collect the subscription data necessary or advantageous for the execution of the working and/or manufacturing processes. In one embodiment, network devices, the function or operation of which requires subscription data associated with a certain spatial area (e.g., certain location information), purposefully subscribe to this (e.g., only this) subscription data, so that the network communication for transferring this subscription data may be kept at a particularly low level. Consequently, networks scale with the number of network devices considerably better using the method according to the present embodiments than by using known methods.

In a development of the method according to the present embodiments, the network device provides and/or receives the subscription data. The network device may therefore form a publishing component of the network, such as a sensor, and/or a subscribing component of the network, such as a control and/or regulation and/or evaluation device.

With the method according to the present embodiments, the at least one item of location information may be an OpenGeoLocation information item. The OpenGeoLocation information may be structured in levels or with a tree structure and/or file structure. In this way, place holders may be used to filter location information hierarchically (e.g., according to the accuracy of the location information).

With the method according to the present embodiments, the location information purposefully forms a level of the tree structure or file structure. In this way, it may be filtered according to the location information (e.g., according to a level of the location information).

With the method according to the present embodiments, the network device may filter subscription data based on the at least one item of location information. The network traffic in the network may thus be kept at a low level, since network devices only have to transfer subscription data that is currently spatially related to the network devices (e.g., related to the location information).

In one embodiment, with the method, the network device alternately occupies multiple (e.g., different) locations; alternatively, the network device is set up to occupy multiple locations alternately, and the at least one or the multiple identifiers simultaneously or alternately contain multiple (e.g., non-identical) items of location information. The multiple items of location information each correspond to one of the locations.

In this way, when transferring subscription data, mobile network devices may limit subscription data to subscription data characterized by location information that indicates a location at which the mobile network device is located, or to subscription data characterized by location information corresponding to the locations along an envisaged motion trajectory of the network device.

In one embodiment, the location is the current location at which the network device is currently located when the network device transfers the subscription data.

Alternatively, with the method according to the present embodiments, at least one of the locations is a prospective and presently not yet occupied location of the network device. The location information about the prospective current location may be different from the location information about the currently occupied location.

With this development of the method according to the present embodiments, the network device may therefore already provide subscription data or receive subscription data that is specific to a location that the network device has not yet occupied, but which the network device will only occupy in the future. For example, dynamic network devices such as autonomous warehouse vehicles, also known as "autonomous guided vehicles", may thus already react to future task allocation and requirements at the destination while travelling to a destination and may take on future tasks at the destination in advance or may communicate free capacities in advance.

The network device according to the present embodiments is configured to receive and/or provide subscription data of a publish-subscribe system. The network device according to the present embodiments is configured to filter an identifier that identifies the subscription data based on at least one item of location information.

In one embodiment, the network device according to the present embodiments is configured to filter such an identifier, which includes at least one item of location information in the form of geographical location coordinates and/or two-dimensional or spatial grid coordinates and/or hierarchical and/or semantic coordinates, based on the at least one item of location information.

In one embodiment, the location information is current location information of the network device (e.g., the location information indicates the location where the network device is located when the network device filters the identifier based on the at least one item of location information).

In one embodiment, the network device is configured to provide subscription data and/or to receive subscription data based on the location information.

The network device according to the present embodiments may be in the form of a mobile network device that may occupy multiple locations alternately and is configured to provide and/or receive and, for example, to filter subscription data based on changing location information. The changing location information corresponds to the changing locations. The changing location information may characterize the changing locations in each case (e.g., the respective location information contains information about the respective locations).

In one embodiment, the locations are the respective current locations of the network device (e.g., the locations where the network device is currently located when the network device provides and/or receives and/or filters subscription data). In this way, mobile network devices may adapt their transmission of subscription data to the respective spatial context and only provide, receive, or filter subscription data with identifiers with location information of a location where the network device is currently located.

In one embodiment, with the network device, at least one location is a prospective location (e.g., an intended and currently not yet occupied location of the network device, such as a location that, compared with the time at which the network device provides and/or receives and/or filters location information characterizing this subscription data based on this location, will be occupied by the network device in the future, and which is not yet occupied by the network device at the time at which the network device provides and/or receives and/or filters location information characterizing subscription data based on this location).

With this development, the network device according to the present embodiments may therefore already provide subscription data or receive subscription data that is specific for a location that the network device has not yet occupied, but which the network device will only occupy in the future. For example, dynamic network devices such as autonomous warehouse vehicles, also known as "Autonomous Guided Vehicles", while travelling to a destination, may thus already react to future task allocations and requirements at the destination and take over tasks prospectively set at the destination, or free capacities in advance. In this way, the network device according to the present embodiments may be used to react flexibly to future or foreseeable requirements. In one embodiment, during the operational process, autonomous warehouse vehicles may arrange future transfers of goods or other objects with each other once a need for such transfers is foreseeable. For example, a spatial distribution of warehouse vehicles may be influenced or controlled by such transfers of goods or objects.

A network according to the present embodiments includes network devices according to the present embodiments.

In one embodiment, each subscribing and/or publishing network device may self-determine the spatial context required for its function. It may also subscribe multiple times for multiple contexts of a different granularity.

BRIEF DESCRIPTION OF THE DRAWINGS

FIG. 1 shows a network with a network device for carrying out a method according to an embodiment for a transfer of subscription data.

DETAILED DESCRIPTION

A network according to the present embodiments shown in FIG. 1 is a network GN for building management of a plurality of buildings containing an industrial plant. Using the network GN, a temperature is controlled in multiple regions of individual buildings S1, S2 of the industrial plant in addition to other known tasks of the building management.

The network GN is configured as an "Internet of Things" (IoT) network that has devices interconnected via the GN network. In the exemplary embodiment shown, the devices include a temperature controller D1 and temperature sensors D2. The temperature controller D1 controls, in parallel with carrying out other temperature control tasks, the temperature in the building S2 and, for this, uses the temperature currently prevailing in the building S2, which is detected by the temperature sensors D2. For this purpose, the temperature controller requests all data from the temperature sensors D2 in the building S2. For communication between the temperature controller D1 and the temperature sensors D2, a subscription system is used in the network GN. In the subscription system, the temperature sensors D2 act as data supply components and publish their data D11, D12, D13 as subscription data A1 using a bus system accessible to the temperature sensors D2 and the temperature controller D1. The subscription data A1 is exchanged with the temperature sensors D2 and with the temperature controller D1 (e.g., using wireless connections WL1 and WL2).

The subscription data A1 contains an identifier B that contains a thematic description of the subscription data. Thus, individual network devices of the network GN may determine the relevance of the subscription data for the operation and/or function of the network device based on the identifier B.

In the subscription system, the identifiers B have a tree-like structure (e.g., the identifiers B have a series of further branching levels P1, P2, P3, P4 that are separated from each other by a separator). In the illustrated exemplary embodiment, the separators are in the form of forward slashes (e.g., as forwards inclined slashes "/"). In principle, however, other arbitrary separators may also be used.

The levels P1, P2, P3, P4 of the identifier are wildcardable (e.g., individual levels P1, P2, P3, P4 do not have to be specified explicitly in order to find identifiers B of the subscription system). For example, single or multiple levels of the levels P1, P2, P3, P4 may be designated as "arbitrarily denoted" using wildcards. In the exemplary embodiment shown, placeholders in the form of plus signs "+" are used.

In the illustrated exemplary embodiment, the wildcardable identifiers contain location information in the form of grid-based spatial descriptions. Using the location information of the identifiers B, network devices D2, D1 may limit their subscriptions for topics to spatial regions and contexts.

In the illustrated exemplary embodiment, the system "MQTT" is used as the publish-subscribe system, which in the above-described and well-known manner, uses placeholders (in this description, also referred to as wildcards) in the form of plus signs

",+"

(https://docs.oasisopen.org/mqtt/mqtt/v5.0/os/mqtt-v5.0-os.html#Toc3901241).

In the well-known publish-subscribe system MQTT, for example, an identifier "v2/+/temperature" characterizes both subscription data with the identifier "v2/livingroom/temperature" and subscription data with the identifier "v2/kitchen/temperature". At the second level of the designation of the subscription data of the subscription, a wildcard "+" is entered, so that publication data with any location information is covered by a subscription set up in this way.

Instead of location information in the form of room identifiers "kitchen" or "livingroom", in the exemplary embodiment shown, grid-based spatial descriptions with accuracy increasing incrementally depending on the code length are used. This location information is formed in the exemplary embodiment known using well-known open location codes (OLC) (https://en.wikipedia.org/wiki/Open_Location_Code) or plus codes (https://plus.codes/) derived therefrom. These divide the world into spherical sectors, where a digit of the open location code always describes a horizontal sector address and another immediately adjacent digit describes a vertical sector address. Thus, a pair of digits of the open location code describes a location. Each subsequent pair of digits divides the sector described in the previous pair again into smaller sectors. Open location codes include four such consecutive sector specifications until a final specification of sub-sectors is produced. For example, 8FWH or 8FWH0000+ describes a sector roughly corresponding to the Munich area, while 8FWH3JRX+RF is the entry to the north entrance at the Siemens site in Munich Perlach with a sector area of approximately 14 m×14 m. Open location codes are just one example of a possible coding such as that required for the method described here. In other, not specifically presented exemplary embodiments, other geographical location coordinates in the form of location grid information or two-dimensional and/or spatial divisions and/or hierarchically structured semantic contexts may be used.

The location information described above is now entered into the wildcardable identifier B in the exemplary embodiment presented. This is done by providing a wildcard filterable block for spatial allocation in the topics of the publish-subscribe system as standard. Each element of the spatial information is to be filterable by wildcard. Using the example of MQTT and OLC, for example, this is implemented as follows:

While subscription data was previously characterized by the identifier B of the form <topic-level-1>/<topic-level-2>, with the method according to the present embodiments, subscription data of the form <topic-level-1>/<OLC 0>/<OLC 1>/<topic-level-2> is used. The level P1 of the identifier B is therefore denoted by "topic-level-1" (e.g., an indication of a technical measurement variable such as temperature). Levels P2 and P3 represent location information in the form of open location codes. The level P4 of the identifier B is formed with an additional measurement parameter in the illustrated exemplary embodiment.

All levels P2, P3 of the identifier B of the open location code may be replaced by wildcards in the subscription according to the specification of the MQTT protocol. The relative position of the spatial codes in the identifier B is in principle arbitrary. For MQTT, placement at the end is advantageous, however, since then, the multi-level wildcard # may be used for subscriptions with shorter spatial codes.

A subscriber (e.g., a network device) that is interested in subscription data in a specific geographic sector then sets up a corresponding subscription by using the wildcards. Using the example of the Munich example above, this will look as follows:

A subscriber J who is interested in publications in the wider region of Munich would set up a subscription using the following identifier B:

<topic-level-1>/8/F/W/H/+/+/+/+/+/+/<topic-level-2>.

A subscriber K who is only interested in publications in the focus area "Einfahrt Siemens München Perlach Nord" would set up a subscription under the following designation B:

<topic-level-1>/8/F/W/H/3/J/R/X/R/F/<topic-level-2>.

The network devices that publish data in the region Einfahrt Siemens Munich Perlach Nord, for example, would include their coded position (e.g., location information) in their identifier, for example <topic-level-1>/8/F/W/H/3/J/R/X/R/F/<topic-level-2>.

Network devices that, for example, publish data in the "Eingang München Perlach Sud" region would include their encoded position in their identifier B, for example <topic-level-1>/8/F/W/H/3/J/Q/W/F/H/<topic-level-2>

Subscriber J would receive both the data from "Einfahrt Siemens München-Perlach Nord" and from "Eingang Siemens Munich Perlach Sud", subscriber K only the data from "Eingang Siemens München Perlach Sud".

The abstract exemplary embodiment shown above is comparatively static. A more dynamic exemplary embodiment with mobile components is a logistics scenario in production.

In this more dynamic exemplary embodiment, 16 factory halls W00 to W33 are arranged on a plot in a four-by-four spatial grid. Autonomous warehouse vehicles, also known as "Autonomous Guided Vehicles", drive in and between the factory halls W00 to W33. The autonomous warehouse vehicles only participate in the task allocation and only receive requirements that are published in the quadrant of their current position.

Schematically, this is simplified as follows:

The identifier of the subscription data in this example has the following file structure <Topic>/<QuadrantX>/<QuadrantY>/<SubQuadrantX>-/<SubQuadrantY>.<Topic> takes on the role of the <topic level-1> of the previously described exemplary embodiment.

In this file structure, the last four levels separated by forward slashes represent location information. Preferential marking of location information with a level preceding the location information "<CodeGPosition>" is omitted in this description for reasons of clarity. For example, in a detailed presentation, <Topic> may always be replaced by "<Topic>/<CodeGPosition>".

For example, tasks are then published by W10 in the subquadrant SubQuadrantX=1, SubQuadrantY=0 under the following identifier: <Topic>/0/0/1/0.

The autonomous warehouse vehicle then matches its subscribed identifiers dynamically to its own position (e.g., to its current location).

If the autonomous warehouse vehicle is located in factory hall W33 (e.g., the subquadrant SubQuadrantX=3, SubQuadrantY=3 and thus in quadrant QuadrantX=1, QuadrantY=1), this results in the following subscribed identifier, which does not match the previous example request: <Topic>/1/1/+/+.

If the autonomous warehouse vehicle now moves and is located in the factory hall W11 (e.g., in the subquadrant SubQuadrantX=1, SubQuadrantY=1 and thus in the quadrant QuadrantX=0, QuadrantY=0), the following subscribed topic results, which then agrees with the previous requirement and thus the requirement passes to the autonomous warehouse vehicle: <Topic>/0/0/+/+.

In a further interpretation, the spatial topics and the possibility of setting up appropriate subscriptions for the spatial topics are only made accessible by identifier-specific access restriction and authorization mechanisms. This allows spatially bound access, security, and privacy mechanisms.

In another interpretation, regular expressions are used instead of simple topic level based wildcards. In a further interpretation, subscriptions are set up for multiple finely granular spatial sectors in order to subscribe to a specific geometric shape by an approximation.

In a further, more dynamic exemplary embodiment, which otherwise corresponds to the previously described exemplary embodiment, the autonomous warehouse vehicles subscribe to topics on locations that the autonomous warehouse vehicles will reach in the future as a result of the respectively planned route. For example, two autonomous warehouse vehicles may use subscription data to arrange a future handover of an object that has been transported by one of these autonomous warehouse vehicles at a location where the two warehouse vehicles will meet later based on the respective planned routes. For this purpose, autonomous warehouse vehicles may advertise offers of collection at the locations of their planned travel route, and autonomous warehouse vehicles may announce a need for an acceptance of their currently transported item at a location of their travel route, which would otherwise have to be adhered to.

Such transfers of objects between warehouse vehicles may be necessary, for example, because of an unforeseen need for warehouse vehicles, such as warehouse vehicles with a certain specification.

While the present disclosure has been described in detail with reference to certain embodiments, the present disclosure is not limited to those embodiments. In view of the present disclosure, many modifications and variations would present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within the scope.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method that is computer-implemented and for transferring subscription data of a publish-subscribe system by a network device of a network, the method comprising:
  characterizing, by a processor, the subscription data with at least one identifier containing at least one item of location information in the form of geographical location coordinates, two-dimensional or spatial grid coordinates, hierarchical, semantic, or hierarchical and semantic coordinates, or any combination thereof; and
  using the at least one item of location information for an operation, a function, or the operation and the function of the network device,
  wherein the network device alternately occupies or is configured to occupy multiple locations,
  wherein the at least one identifier alternately or simultaneously contains multiple items of location information, and
  wherein the location information corresponds to the multiple locations.

2. The method of claim 1, wherein using the at least one item of location information for the operation, the function, or the operation and the function of the network device comprises using the at least one item of location information for the operation, or the operation and the function of the network device, and
  wherein the function is a function in a working, manufacturing, or working and manufacturing process, information for carrying out at least one process step of the working, manufacturing, or working and manufacturing process, a control function of at least one process step of the working, manufacturing, or working and manufacturing process, or any combination thereof.

3. The method of claim 2, wherein the function is a function in at least one process step of the working, manufacturing, or working and manufacturing process.

4. The method of claim 2, wherein the function is sensor information for carrying out at least one process step of the working, manufacturing, or working and manufacturing process.

5. The method of claim 1, further comprising providing, receiving, or providing and receiving, by the network device, the subscription data.

6. The method of claim 1, wherein the at least one item of location information is OpenGeoLocalization information or OpenGeoLocation Information.

7. The method of claim 1, wherein the identifier has a tree structure, a file structure, or the tree structure and the file structure.

8. The method of claim 1, wherein the location information forms a level of the tree structure or the file structure.

9. The method of claim 1, further comprising filtering, by the network device, the subscription data based on the at least one item of location information.

10. The method of claim 1, wherein at least one of the multiple locations is a future and not yet occupied position of the network device.

11. A network device configured for transferring subscription data of a publish-subscribe system, the network device comprising:
  a processor configured to filter an identifier that characterizes the subscription data based on at least one item of location information, the identifier containing the at least one item of location information in the form of geographical location coordinates, two-dimensional or spatial grid coordinates, hierarchical, semantic, or hierarchical and semantic coordinates, or any combination thereof,
  wherein the network device is in the form of a mobile network device that is configured to:
    alternately occupy multiple local positions; and
    provide, receive, or provide and receive the subscription data based on multiple items of location information, and
  wherein the multiple items of location information correspond to changing locations.

12. The network device of claim 11, wherein the network device is configured to:
  provide the subscription data based on the at least one item of location information;
  receive the subscription data; or
  a combination thereof.

13. The network device of claim 11, wherein at least one location of the multiple local positions is a future and currently not yet occupied location of the network device.

14. The network device of claim 11, wherein the mobile network device is further configured to filter the subscription data based on the at least one item of location information.